US011867283B2

(12) United States Patent
Hayashi et al.

(10) Patent No.: US 11,867,283 B2
(45) Date of Patent: Jan. 9, 2024

(54) METHOD OF MANUFACTURING A POWER TRANSMISSION DEVICE

(71) Applicant: TOYOTA JIDOSHA KABUSHIKI KAISHA, Toyota (JP)

(72) Inventors: Koki Hayashi, Toyota (JP); Hiroaki Hatsuyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/657,488

(22) Filed: Mar. 31, 2022

(65) Prior Publication Data
US 2022/0381335 A1 Dec. 1, 2022

(30) Foreign Application Priority Data

May 26, 2021 (JP) ................................. 2021-088177

(51) Int. Cl.
B23P 15/14 (2006.01)
F16H 57/08 (2006.01)
C21D 9/32 (2006.01)
B23K 1/00 (2006.01)

(52) U.S. Cl.
CPC ......... F16H 57/082 (2013.01); B23K 1/0008 (2013.01); B23P 15/14 (2013.01); C21D 9/32 (2013.01)

(58) Field of Classification Search
CPC ....................................................... B23P 15/14
See application file for complete search history.

(56) References Cited

U.S. PATENT DOCUMENTS

| 4,675,488 A * | 6/1987 | Mucha | C21D 9/32 |
| | | | 219/652 |
| 6,723,020 B2 * | 4/2004 | Ohbayashi | C21D 1/10 |
| | | | 475/348 |
| 8,382,632 B2 * | 2/2013 | Segawa | B23P 15/14 |
| | | | 74/606 R |
| 9,434,032 B2 * | 9/2016 | Basin | F16H 57/082 |
| 10,228,053 B2 * | 3/2019 | Rippelmeyer | B23B 51/08 |

(Continued)

FOREIGN PATENT DOCUMENTS

| JP | 2018-59600 A | 4/2018 |
| JP | 2019-124299 A | 7/2019 |
| JP | 2019-132350 A | 8/2019 |

Primary Examiner — Sarang Afzali
(74) Attorney, Agent, or Firm — Oblon, McClelland, Maier & Neustadt, L.L.P.

(57) ABSTRACT

The disclosure is directed to a method of manufacturing a power transmission device that can include forging to form a planetary carrier plate integrated with dog teeth, sintering to form a planetary carrier, and joining the planetary carrier plate to the planetary carrier by brazing the planetary carrier plate to the planetary carrier at support parts arranged in a circumferential direction at a peripheral edge part of the planetary carrier so that the planetary carrier plate is fixed to face the planetary carrier on a side of the planetary carrier where a pinion gear is positioned. The method can further include sintering the planetary carrier plate and the planetary carrier, forming a pinion shaft hole for mounting a pinion shaft that constitutes the pinion gear in the planetary carrier plate and the planetary carrier, and performing high-frequency quenching on the dog teeth of the planetary carrier plate.

1 Claim, 5 Drawing Sheets

(56) References Cited

U.S. PATENT DOCUMENTS

| | | | |
|---|---|---|---|
| 11,339,870 B2* | 5/2022 | Muramatsu | F16H 57/082 |
| 11,697,859 B2* | 7/2023 | Li | B25B 7/02 |
| | | | 269/214 |
| 2016/0229009 A1* | 8/2016 | Klein-Hitpass | B23P 15/14 |
| 2019/0234471 A1 | 8/2019 | Yoshino et al. | |

* cited by examiner

METHOD OF MANUFACTURING A POWER TRANSMISSION DEVICE

CROSS REFERENCE TO RELATED APPLICATIONS

This application is based upon and claims the benefit of priority from Japanese patent application No. 2021-088177, filed on May 26, 2021, the disclosure of which is incorporated herein in its entirety by reference.

BACKGROUND

The present disclosure relates to a power transmission device and a method of manufacturing the same.

A power transmission device used for a reduction gear of an automobile or the like uses a planetary gear capable of obtaining a large reduction ratio with a small number of stages compared with a reduction gear device combined with a spur gear. A planetary gear is a pair of mutually meshing gears in which when one of the two gears rotates, at the same time, one gear revolves around a shaft of the other gear.

Japanese Unexamined Patent Application Publication No. 2018-059600 discloses a technique for forming a transmission having dog teeth by welding each part.

SUMMARY

A power transmission device used in a vehicle may be provided with a plurality of meshing type engaging mechanisms. Therefore, it is necessary to shorten a shaft length of the power transmission device in order to improve mountability. When a power transmission device including a planetary gear has parts to be welded, each of the parts needs to have enough welding length. Therefore, there is a possibility that a shaft length of the parts may increase. There is room for improving power transmission devices including planetary gears to prevent such an increase in the shaft length.

In order to solve such a problem, an object of the present disclosure is to provide a power transmission device and a method of manufacturing the same capable of shortening a shaft length and improving mountability.

A power transmission device according to the present disclosure includes: a planetary carrier configured to support a pinion shaft pivotally supporting a pinion gear, rotatably support the pinion gear, and cause the pinion gear to revolve by rotation of the planetary carrier; and a planetary carrier plate fixed fo face the planetary carrier on a side of the planetary carrier where the pinion gear is positioned, and including dog teeth integrally formed with the planetary carrier plate.

A method of manufacturing a power transmission device according to the present disclosure includes: fixing a planetary carrier plate to face a planetary carrier on a side of the planetary carrier where the pinion gear is positioned; and forming the planetary carrier plate integrally with dog teeth.

According to the present disclosure, it is possible to provide a power transmission device and a method of manufacturing the same capable of shortening a shaft length and improving mountability.

The above and other objects, features and advantages of the present disclosure will become more fully understood from the detailed description given hereinbelow and the accompanying drawings which are given by way of illustration only, and thus are not to be considered as limiting the present disclosure.

DESCRIPTION OF EMBODIMENTS

Hereinafter, embodiments will be described with reference to the drawings. Since the drawings are simplified, the technical scope of the embodiments should not be narrowly interpreted on the basis of the description of the drawings. The same elements are denoted by the same reference signs, and repeated descriptions are omitted. When reference is made to the number of elements or the like including the number of pieces, numerical values, quantity, area, etc. in the following embodiments, the number thereof is not limited to a specific number and may be greater than or less than or equal to the specific number unless otherwise particularly specified and definitely limited to the specific number in principle.

<History of Study Until Power Transmission Device According to the Embodiment is Conceived>

Figure 4:
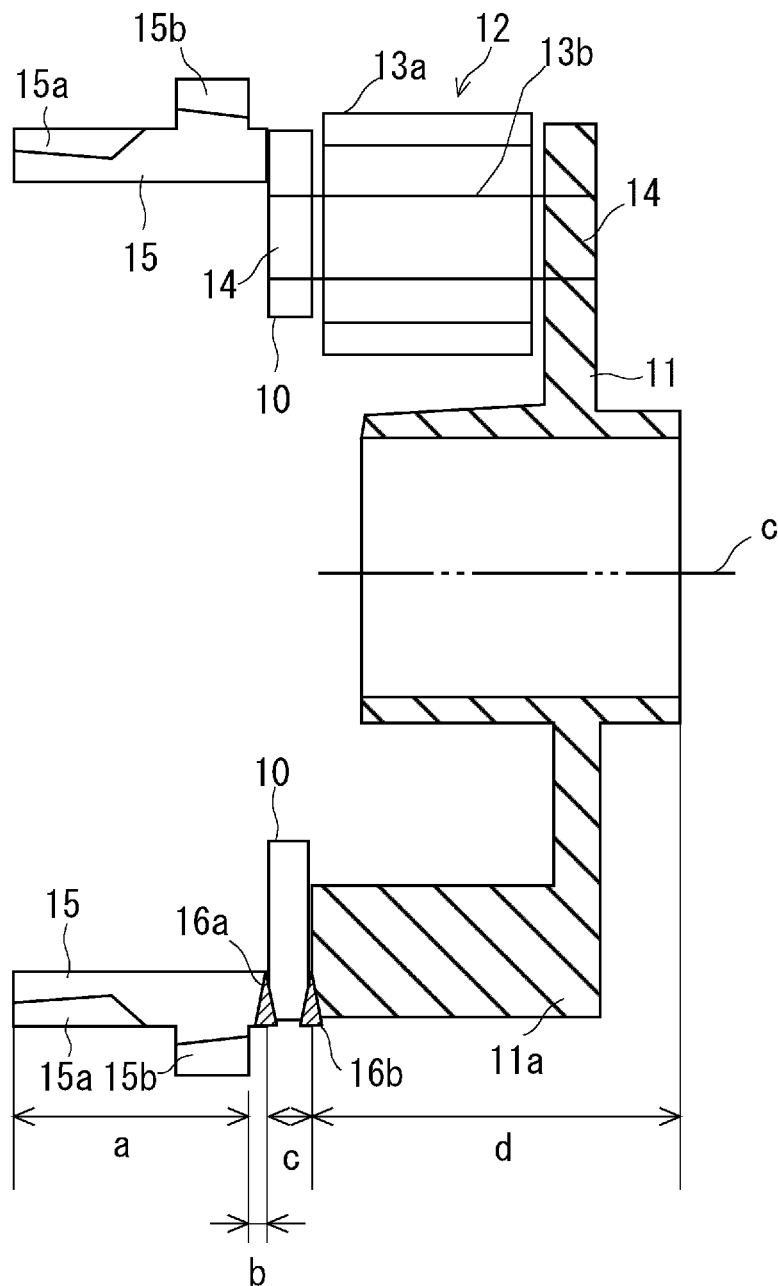
FIG. 4 is a vertical sectional view showing a configuration of a power transmission device according to related art.

A related power transmission device 1 will be described with reference to FIG. 4. FIG. 4 is a vertical sectional view showing a configuration of the related power transmission device 1. As shown in FIG. 4, the related power transmission device 1 includes a planetary carrier plate 10, a planetary carrier 11, a pinion gear 12, and a rotary member 15.

The planetary carrier plate 10 is provided with a pinion shaft hole 14. In the planetary carrier 11, a plurality of support parts 11a are arranged in a circumferential direction at a peripheral edge part. The planetary carrier 11 is provided with a pinion shaft hole 14. The planetary carrier 11 rotates around a rotary shaft c. The planetary carrier 11 supports a pinion shaft 13b pivotally supporting the pinion gear 12, rotatably supports the pinion gear 12, and causes the pinion gear 12 to revolve by rotation of the planetary carrier 11.

The pinion gear 12 includes a spline 13a and a pinion shaft 13b. The spline 13a is attached to the pinion shaft 13b. The pinion shaft 13b is fitted into each of the pinion shaft hole 14 of the planetary carrier 11 and the pinion shaft hole 14 of the planetary carrier plate 10. The rotary member 15 includes dog teeth 15a and 15b.

Figure 5:
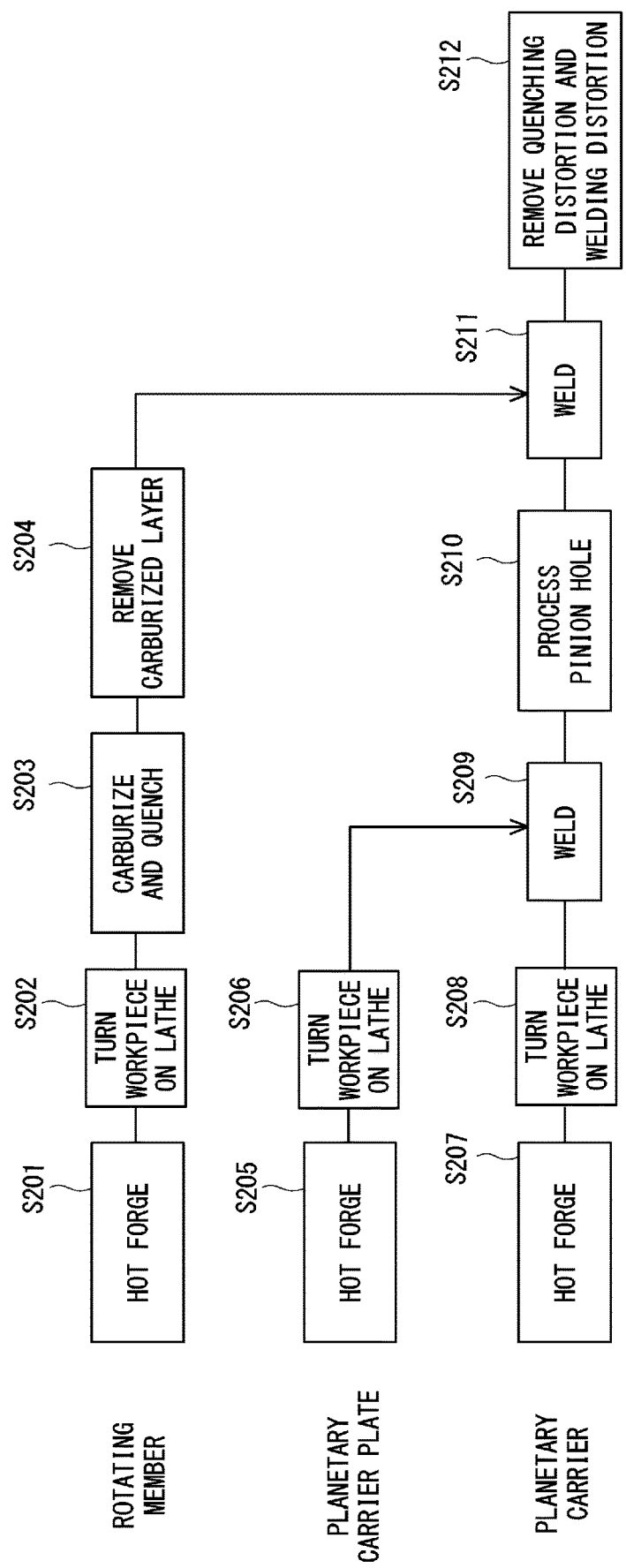
FIG. 5 is a flowchart of a process of manufacturing the related power transmission device.

Next, a manufacturing process of the related power transmission device 1 will be described with reference to FIG. 5. FIG. 5 is a flowchart of the process of manufacturing the related power transmission device.

First, the rotary member 15 is hot-forged to have a predetermined shape (step 201). Next, the rotary member 15 is rotated and cut on a lathe (step 202), carbon is infiltrated into the surface of the rotary member 15 and then diffused therefrom, and then the rotary member 15 is quenched so that the rotary member 15 is subjected to a carburizing and quenching process (step 203) to give it high abrasion resistance characteristics. Removal of a carburized layer, which is treatment after the carburization, gives stress between a surface layer and inside of the rotary member 15, so that resistance to cracking is given to the rotary member 15 (step 204). The planetary carrier plate 10 is also subjected to hot-forged (step 205) and then turned on a lathe (step 206) in order to give it a predetermined shape.

The planetary carrier 11 is hot-forged (step 207) and then turned on a lathe (step 208). After that, the lathed planetary carrier plate 10 is welded to the planetary carrier 11 at a welded part 16a (step 209), and then the pinion shaft hole 14 for processing a hole for mounting the pinion shaft 13b constituting the pinion gear 12 is formed in the planetary carrier 11 (step 210). Further, the rotary member 15, from which the carburized layer has been removed, is welded to the planetary carrier plate 10 at a welded part 16b (step 211), and then distortion due to the welding is removed (step 212).

As described above, in the related power transmission device 1, three parts, which are the planetary carrier plate 10, the planetary carrier 11, and the rotary member 15, are formed by welding them at the welded parts 16a and 16b. Thus, when parts to be welded are included, each of the parts needs to have enough welding length. The welding length corresponds to the length of b+c shown in FIG. 4.

The rotary member 15 is welded to the planetary carrier plate 10. Since the planetary carrier plate 10 is carburized by using a carburizable material to ensure strength, a carburized layer is formed at a certain depth from the surface. However, the carburized layer must be removed to weld each part. The reason for this is to avoid insufficient welding. In the process of removing the carburized layer, considerable time and effort are required, because the carburized layer has high strength.

Further, when the dog teeth 15a and 15b are formed in the rotary member 15, it is necessary to perform high-frequency quenching or carburizing quenching on the dog teeth 15a and 15b in order to ensure the strength of the dog teeth 15a and 15b. At this time, the hardness of the carburization quenching is required to be high. At this time, the hardness is, for example, 600 or more in Vickers hardness (Hv).

As described above, the planetary carrier plate 10 is provided with the pinion shaft hole 14. Since the pinion shaft hole 14 requires high-precision finishing in the unit of μm, it is necessary to control the hardness Hv of the pinion shaft to, for example, about 250 or less. The hardness of the planetary carrier plate 10 provided with the pinion shaft hole 14 is higher than that of the planetary carrier 11 similarly provided with the pinion shaft hole 14. Therefore, an advanced technique is required for machining each pinion shaft hole 14.

In order to address this issue, a power transmission device 1 according to the following embodiment which can solve such a problem has been found.

First Embodiment

Figure 1:
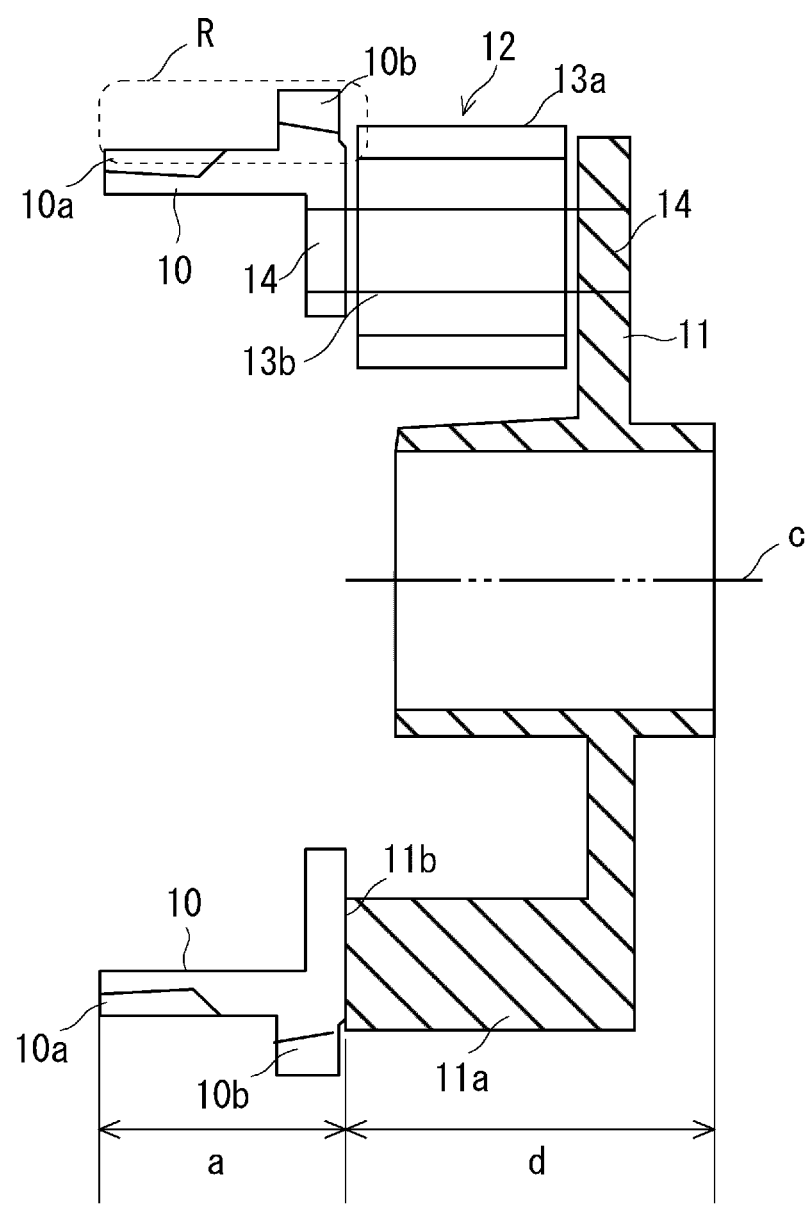
FIG. 1 is a vertical sectional view showing a configuration of a power transmission device according to a first embodiment of the present disclosure.
Figure 2:
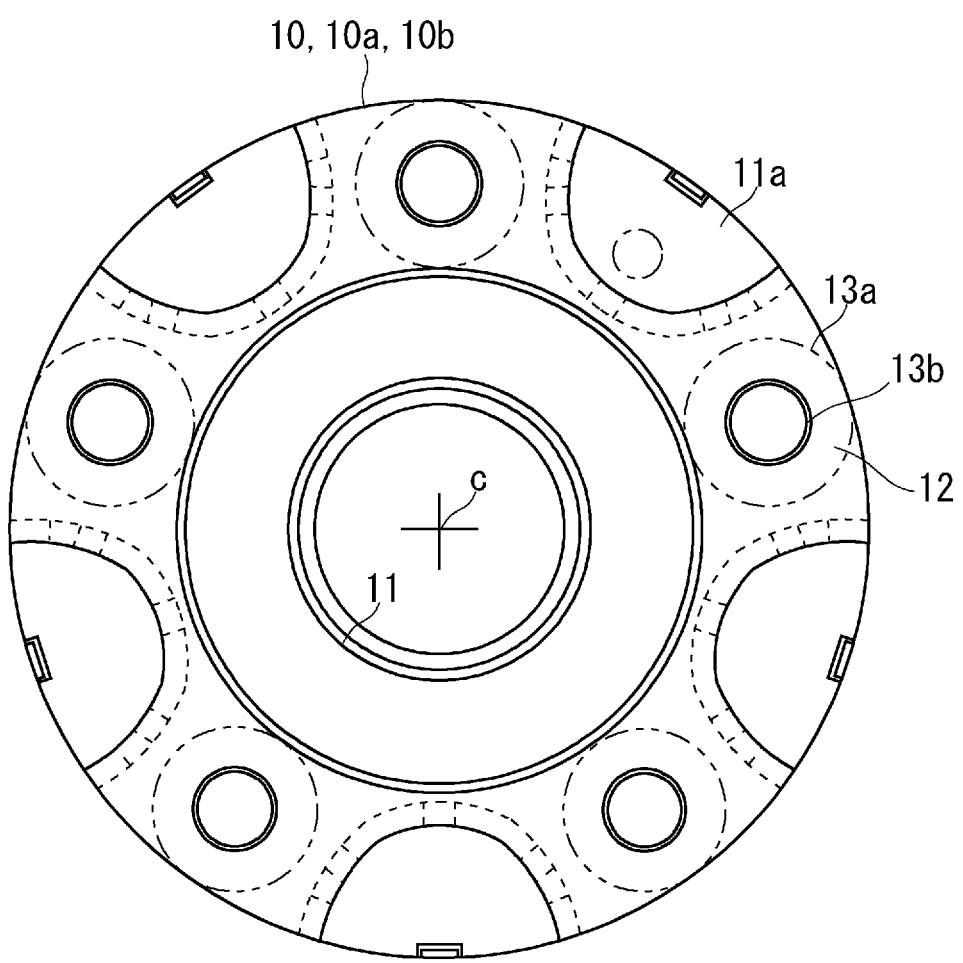
FIG. 2 is a horizontal sectional view showing a configuration of the power transmission device according to the first embodiment of the present disclosure.

A power transmission device 1 according to this embodiment will be described with reference to FIGS. 1 and 2. FIG. 1 is a vertical sectional view showing a configuration of the power transmission device 1 according to this embodiment. FIG. 2 is a horizontal sectional view showing a configuration of the power transmission device 1 according to this embodiment. As shown in FIG. 1, the power transmission device 1 includes a planetary carrier plate 10, a planetary carrier 11, and a pinion gear 12.

The planetary carrier plate 10 includes dog teeth 10a and 10b and a pinion shaft hole 14. The planetary carrier plate 10 is fixed to face the planetary carrier 11 on a side of the planetary carrier where the pinion gear 12 is positioned. More specifically, the planetary carrier plate 10 may abut against the support part 11a of the planetary carrier 11 and be provided for the planetary carrier 11 with the pinion shaft 13b interposed therebetween. Unlike the related power transmission device 1, in the planetary carrier plate 10 according to this embodiment, the dog teeth 10a and 10b are integrally formed by integrally constituting the rotary member.

In the planetary carrier 11, a plurality of support parts 11a are arranged in a circumferential direction at a peripheral edge part. The planetary carrier 11 is provided with a pinion shaft hole 14. The planetary carrier 11 rotates around a rotary shaft c. The planetary carrier 11 supports a pinion shaft 13b pivotally supporting the pinion gear 12, rotatably supports the pinion gear 12, and causes the pinion gear 12 to revolve by rotation of the planetary carrier 11.

The pinion gear 12 includes a spline 13a and a pinion shaft 13b. The spline 13a is attached to the pinion shaft 13b. The pinion shaft 13b is fitted into each of the pinion shaft hole 14 of the planetary carrier 11 and the pinion shaft hole 14 of the planetary carrier plate 10.

The pinion gear 12 may be configured to mesh with a ring gear (not shown) provided coaxially with the rotary shaft c of the power transmission device 1 and surrounding an outer periphery of a sun gear (not shown). The planetary carrier 11 rotatably supports a plurality of pinion gears 12 are arranged concentrically with respect to the sun gear.

As shown in FIG. 1, the planetary carrier plate 10 according to this embodiment is formed by integrating the planetary carrier plate 10 and the rotary member 15 of the related power transmission device 1. Therefore, the planetary carrier plate 10 according to this embodiment has a plate part extending in a direction perpendicular to the rotary shaft c and on a rotational inner peripheral side. The planetary carrier plate 10 has a structure equivalent to that of a plate, and is joined to the planetary carrier 11 by brazing the planetary carrier plate 10 to the planetary carrier 11 at a brazing joint part 11b of the plate part in order to ensure integration with the planetary carrier 11. The planetary carrier plate 10 is a forged product forged by using a forging material. For example, a material such as S45C is used as the forging material, but the forging material is not limited to this, and instead a material that can be subjected to high-frequency quenching can be used.

Therefore, the power transmission device 1 can be formed by joining two parts, which are the planetary carrier plate 10 and the planetary carrier 11, by brazing the planetary carrier plate 10 to the planetary carrier 11 at the brazing joint part 11b of the support part 11a.

Figure 3:
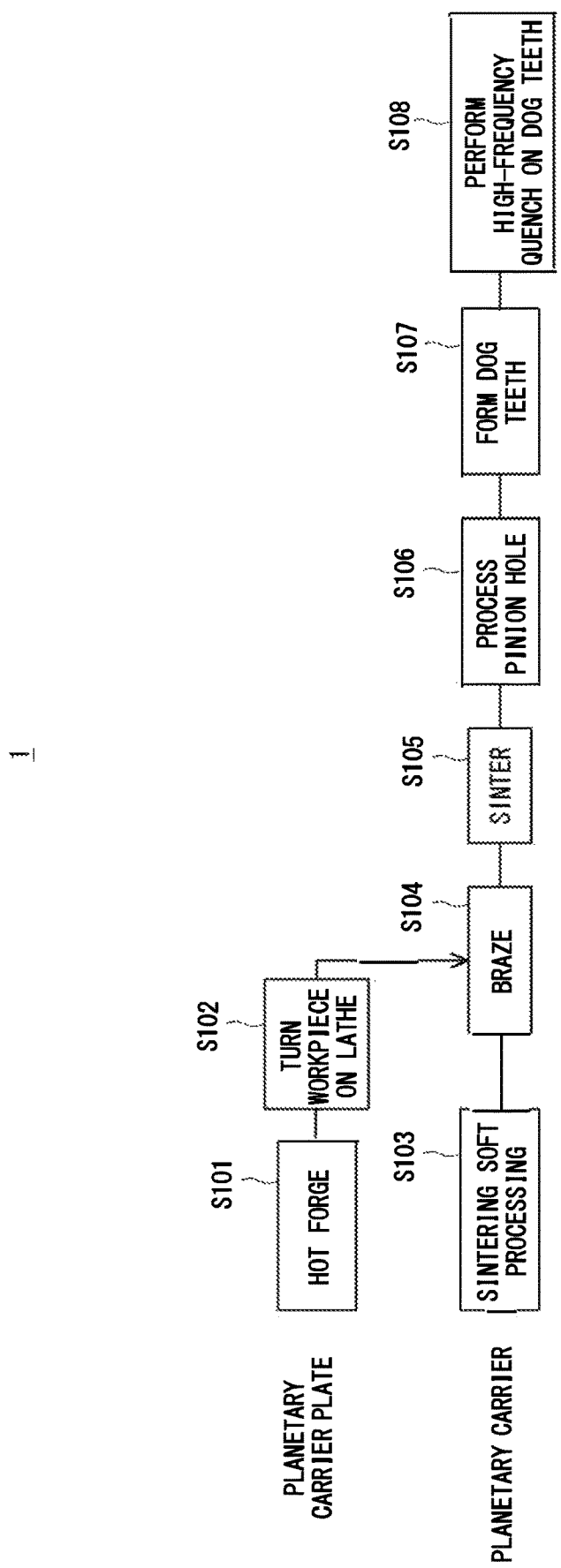
FIG. 3 is a flowchart showing a process of manufacturing the power transmission device according to the first embodiment of the present disclosure.

The process of manufacturing the power transmission device 1 according to this embodiment will be described with reference to FIG. 3. FIG. 3 is a flowchart showing a process of manufacturing the power transmission device 1 according to this embodiment.

First, in order to form the planetary carrier plate 10 and the dog teeth 10a and 10b into a predetermined integral shape, the planetary carrier plate 10 is hot-forged (step 101) and then turned on a lathe (step 102).

As to the planetary carrier 11, a powdered sintering material is subjected to sintering soft processing into a predetermined shape (step 103). The planetary carrier 11 is joined to the lathed planetary carrier plate 10 by brazing the planetary carrier 11 to the planetary carrier plate 10 at a brazing joint part 11b (step 104). After that, the planetary carrier 11 is sintered with the planetary carrier plate 10 (step 105), and then the pinion shaft hole 14 for processing a hole for mounting the pinion shaft 13b constituting the pinion gear 12 is formed in the planetary carrier 11 (step 106). Further, dog teeth 10a and 10b are formed in the planetary carrier plate 10 (step 107), and the formed dog teeth 10a and 10b are locally quenched by using a high frequency to maintain hardness (step 108). The hardness Hv of the quenching may be 600 or more, but is not limited to this, and may be a hardness according to the material or structure.

As described above, the power transmission device 1 according to this embodiment is manufactured by using a sintering material for the planetary carrier 11. The planetary carrier plate 10 is forged using a forging material. For example, a material such as S45C is used as the forging material, but the forging material is not limited to this, and instead a material that can be subjected to high-frequency quenching can be used. The planetary carrier 11 is joined to the planetary carrier plate 10 by brazing the planetary carrier 11 to the planetary carrier plate 10 at the brazing joint part 11b.

A predetermined area R of the planetary carrier plate 10, which is formed of a forging material, is subjected to high-frequency quenching. The predetermined area R refers to a area around the dog teeth 10a and 10b which requires a predetermined strength. Note that the predetermined area R does not necessarily refer to the entire area shown in FIG. 1, and instead may refer to just be a part of the area shown in FIG. 1 or may be outside the area shown in FIG. 1. Thus, the pinion shaft hole 14 can be relatively easily processed with a micrometer unit of precision for the hole diameter. Further, since the planetary carrier plate 10 does not have a carburized layer and is not welded by a laser beam or the like, a process requiring time and effort such as removal of the carburized layer becomes unnecessary.

Further, the number of parts necessary for the structure of the power transmission device 1 is reduced, and joining is performed by brazing each part instead of welding each part as a method of fixing the parts. Therefore, the welding length of each part for the structure of the power transmission device 1 shown in FIG. 1 can be made shorter than the welding length of each part for the structure of the related power transmission device 1 shown in FIG. 4 by a length corresponding to the length of b+c shown in FIG. 4.

According to the power transmission device 1 of this embodiment, a shaft length can be made shorter and mountability can be improved.

Although the present disclosure has been described in accordance with the above embodiment, the present disclosure is not limited to the configuration of the above embodiment, and of course includes various modifications, corrections, and combinations that can be made by a person skilled in the art within the scope of the claimed disclosure.

From the disclosure thus described, it will be obvious that the embodiments of the disclosure may be varied in many ways. Such variations are not to be regarded as a departure from the spirit and scope of the disclosure, and all such modifications as would be obvious to one skilled in the art are intended for inclusion within the scope of the following claims.

What is claimed is:

1. A method of manufacturing a power transmission device, the method comprising:
    forging to form a planetary carrier plate:
    sintering to form a planetary carrier:
    joining the planetary carrier plate to the planetary carrier by brazing the planetary carrier plate to the planetary carrier at support parts arranged in a circumferential direction at a peripheral edge part of the planetary carrier so that the planetary carrier plate is fixed to face the planetary carrier on a side of the planetary carrier where a pinion gear is positioned;
    sintering the planetary carrier plate and the planetary carrier after brazing;
    forming a pinion shaft hole for mounting a pinion shaft that constitutes the pinion gear in the planetary carrier plate and the planetary carrier;
    forming dog teeth integral with the planetary carrier plate; and
    performing high-frequency quenching on the dog teeth of the planetary carrier plate.

* * * * *